United States Patent
Watanabe et al.

(10) Patent No.: US 8,756,380 B2
(45) Date of Patent: Jun. 17, 2014

(54) CONTROLLING ACCESS TO A REMOVABLE MEDIUM FROM A MODULE AND AN EXTERNAL DEVICE

(75) Inventors: Keiko Watanabe, Fuchu (JP); Jun Sato, Kokubunji (JP); Junichi Iwasaki, Fussa (JP); Takashi Minemura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 133 days.

(21) Appl. No.: 13/426,546

(22) Filed: Mar. 21, 2012

(65) Prior Publication Data

US 2013/0061015 A1 Mar. 7, 2013

(30) Foreign Application Priority Data

Sep. 7, 2011 (JP) ................................ 2011-195225

(51) Int. Cl.
G06F 12/14 (2006.01)

(52) U.S. Cl.
USPC .................................. 711/150; 711/E12.098

(58) Field of Classification Search
USPC .......... 711/147, 150, 152, E12.019, E12.098, 711/E12.099
See application file for complete search history.

(56) References Cited

U.S. PATENT DOCUMENTS

| | | | | |
|---|---|---|---|---|
| 5,678,021 A | * | 10/1997 | Pawate et al. | 711/104 |
| 6,023,748 A | * | 2/2000 | Peters et al. | 711/151 |
| 7,574,482 B2 | * | 8/2009 | Brown et al. | 709/217 |
| 2003/0061408 A1 | | 3/2003 | Ayaki | |
| 2007/0174551 A1 | * | 7/2007 | Cornwell et al. | 711/118 |
| 2009/0043971 A1 | * | 2/2009 | Kim | 711/150 |
| 2009/0210621 A1 | * | 8/2009 | Honda et al. | 711/115 |
| 2011/0131386 A1 | * | 6/2011 | Okutsu | 711/163 |
| 2013/0061015 A1 | | 3/2013 | Watanabe et al. | |

FOREIGN PATENT DOCUMENTS

| | | |
|---|---|---|
| EP | 1582972 A2 | 10/2005 |
| EP | 1582972 A3 | 10/2005 |
| JP | 06-318190 A | 11/1994 |
| JP | 2001189050 A | 7/2001 |
| JP | 2002245425 A | 8/2002 |
| JP | 2003233578 A | 8/2003 |
| JP | 2003337763 A | 11/2003 |
| JP | 2006-302292 | 11/2006 |
| JP | 2007114998 A | 5/2007 |
| JP | 2009129402 A | 6/2009 |
| JP | 2009-543446 | 12/2009 |
| JP | 2010536091 A | 11/2010 |
| JP | 2011-517862 | 6/2011 |
| JP | 2011118580 A | 6/2011 |

OTHER PUBLICATIONS

European Search Report dated Dec. 11, 2012, filed in European counterpart Application No. 12160959.8, 5 pages.

(Continued)

Primary Examiner — Hal Schnee
(74) Attorney, Agent, or Firm — Patterson & Sheridan LLP

(57) ABSTRACT

According to one embodiment, an access control apparatus includes a medium communication module configured to perform communication with a removable medium, a access module configured to perform access to the removable medium using the communication module, a wireless communication module configured to perform wireless communication with a external device, and to receive access request to the removable medium, and a controller configured to assign an access right to access the removable medium to one of the access module and the external device, the control module assigning the access right in response to a request of assignment of the access right, the request being transmitted from the external device or the access module.

14 Claims, 16 Drawing Sheets

(56) References Cited

OTHER PUBLICATIONS

Japanese Office Action for Japanese Application No. 2011-195225 dated Jul. 24, 2012.
Masafumi Matsumura, Ultrahigh-Speed wireless Communication Technologies, Toshiba Review, vol. 61, No. 4, Toshiba Review, Kabushiki Kaisha Toshiba, Toshiba Corporation, Apr. 1, 2006, vol. 61, p. 36-39.

Masafumi Matsumura, Evolution of the Wireless Network Society, Wireless network integrated into the society, Toshiba review, vol. 60, No. 4, Toshiba Review, Kabushiki Kaisha Toshiba, Toshiba Corporation, Apr. 1, 2005. vol. 60, p. 36-39.
Japanese Office Action for Japanese Application No. 2013-029042 dated Jan. 21, 2014.

* cited by examiner

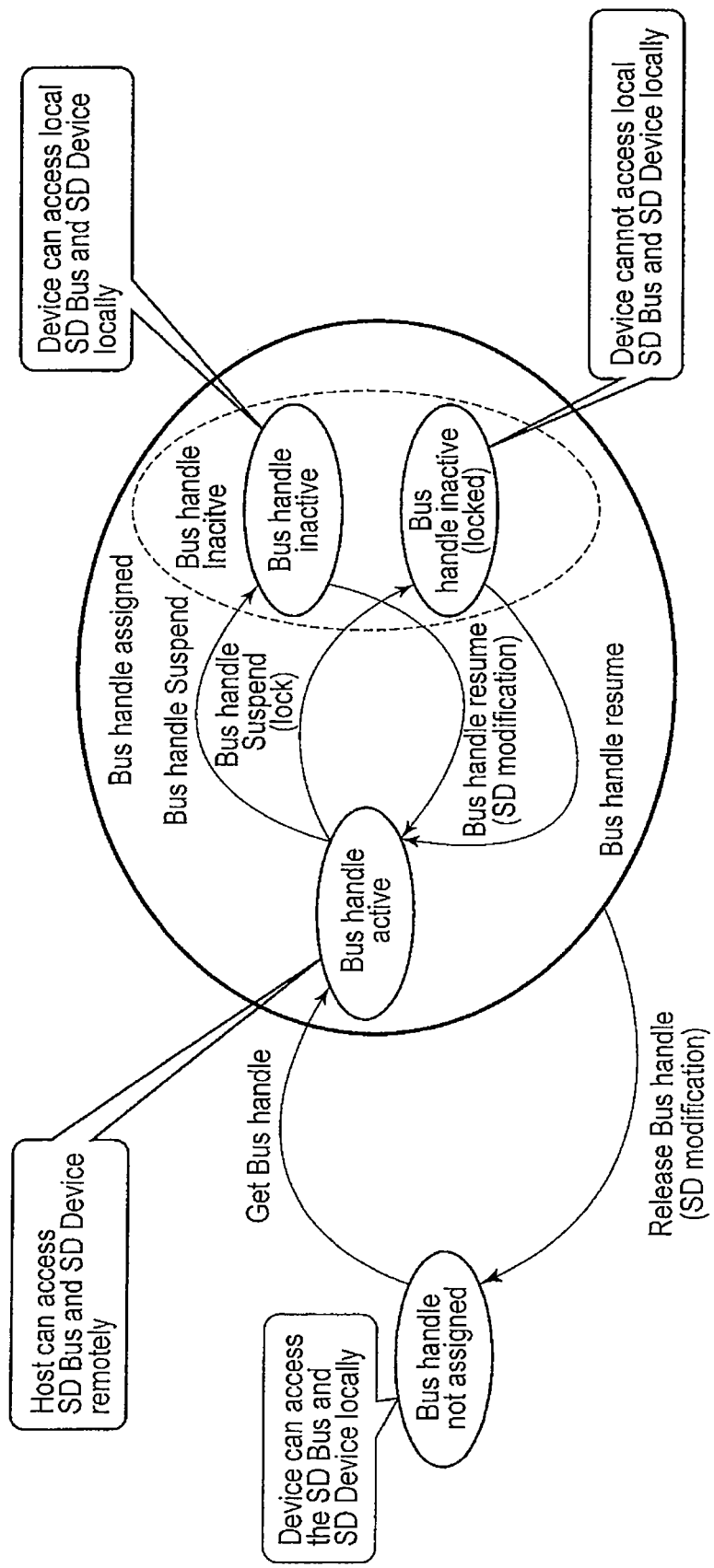
F I G. 5

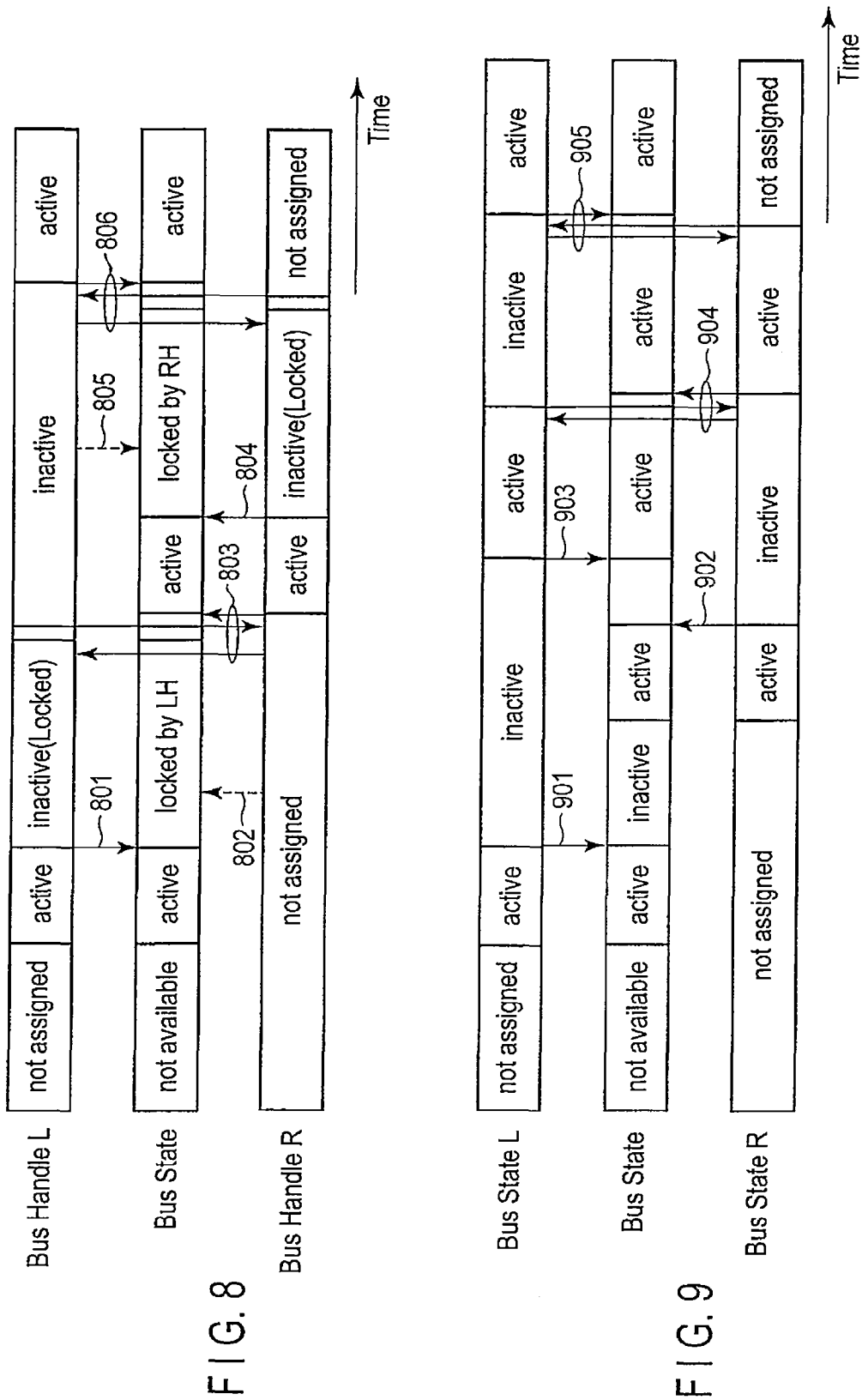

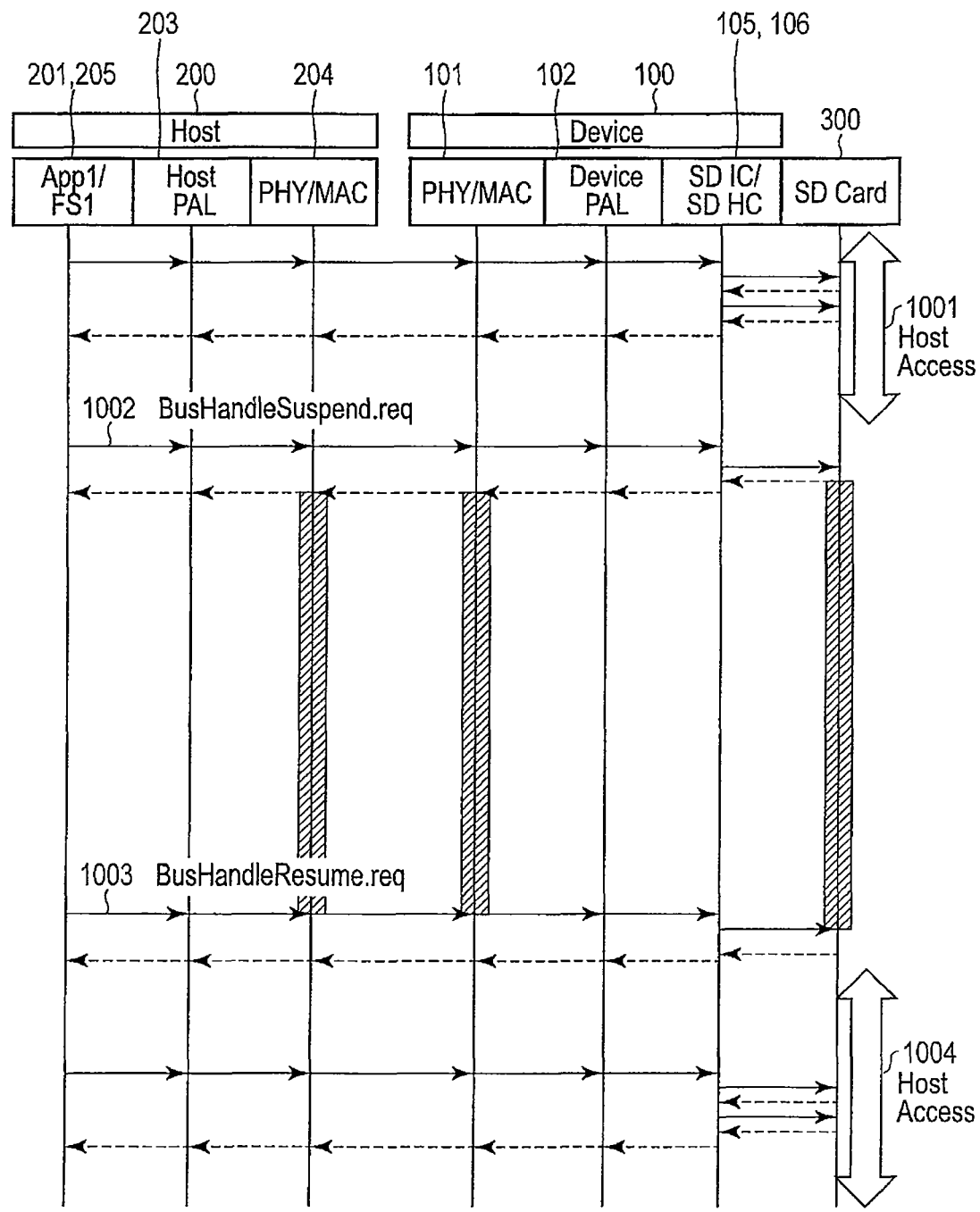
F I G. 10

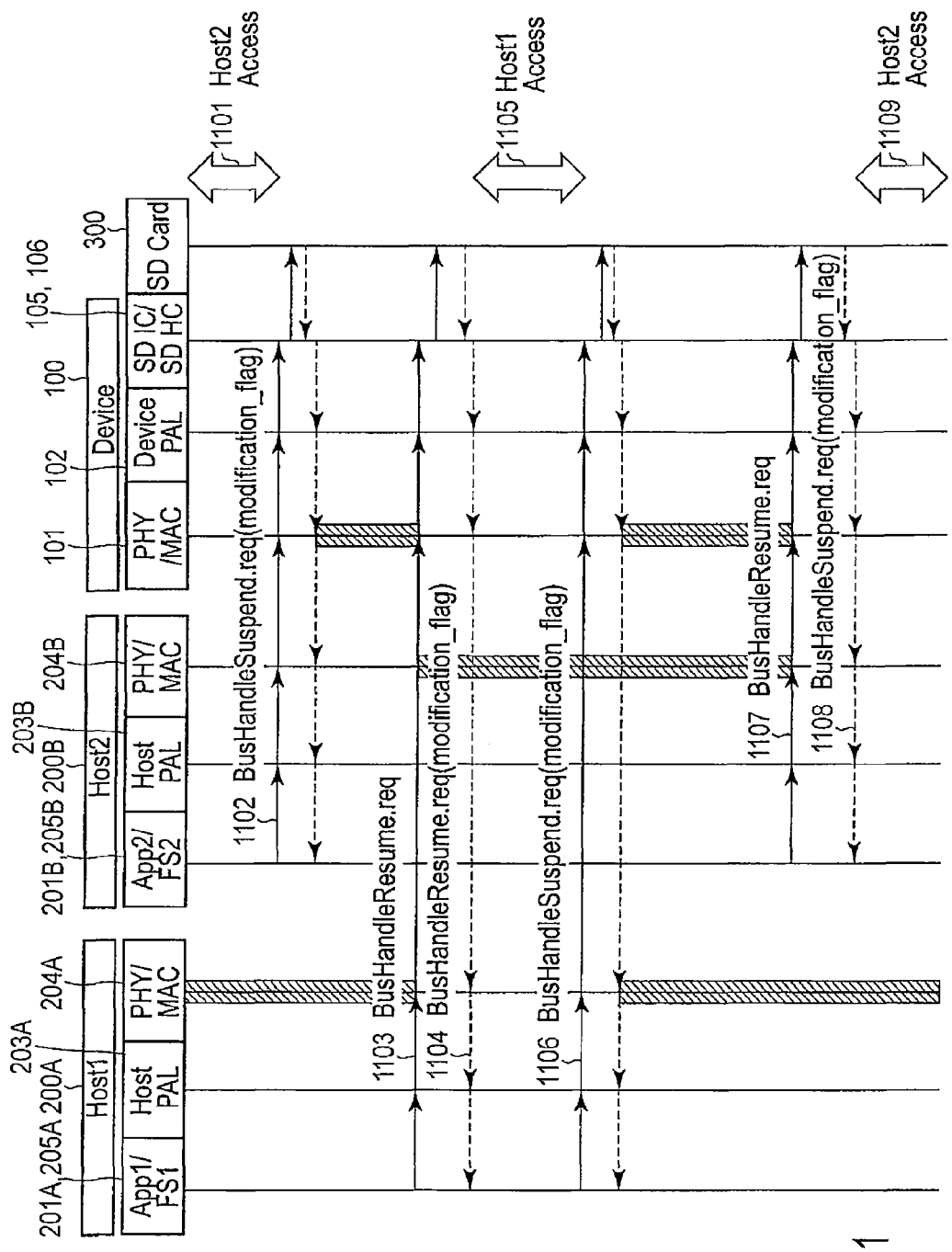
F I G. 11

| Function/Parameter | | Valid range | Description |
|---|---|---|---|
| GetBusHandle.request | | | |
| request_level | | 0=if available | Host PAL requests GetBusHandle with the specified access_type if bus is available |
| | | 1=notify required | If GetBusHandle with tthe specified access type is not available, notification is required when the bus becomes available with the specified access type |
| GetBusHandle.response | | | |
| result_code | | 0=success | The bus is successfully activated by Host PAL |
| | | 1=error_busy | The bus is already activated by another host |
| | | 2=error_locked | Bus is inactivated by another host |

F I G. 15

| Function/Parameter | | Valid range | Description |
|---|---|---|---|
| ReleaseBusHandle.request | | | |
| modification_flag | | 0=not changed | SD status has not been changed while bus is active |
| | | 1=changed | SD status has been changed while bus is active |
| ReleaseBusHandle.response | | | |
| result_code | | 0=success | |

F I G. 16

| Function/Parameter | | Valid range | Description |
|---|---|---|---|
| BusHandleResume.request | | | If bus is locked by Host PAL, only the Host PAL that has suspended the bus in lock mode, can only send BusResume.request.<br>If bus is not locked, any Host PAL can send BusResume.request. |
| | request_level | 0=if available | Host PAL request BusResume with the specified access_type only when the bus is available. |
| | | 1=notify required | If BusRsume with the specified access type is not available, notification is required when the bus becomes available. |
| BusHandleResume.response | | | |
| | modification_flag | 0=not changed | SD status has not been changed by another host while bus is suspended by Host PAL.<br>If bus is locked by Host PAL, modification_flag is always set to 0. |
| | | 1=changed | SD status has been changed by another host while bus is suspended by Host PAL. |
| | result_code | 0=success | The bus is successfully activated by Host PAL. |
| | | 1=error_busy | The bus is already inactivated by another host. |
| | | 2=error_locked | The bus is inactivated and locked by another host. |

FIG. 17

| Function/Parameter | | Valid range | Description |
|---|---|---|---|
| BusHandleSuspend.request | | | |
| | | 0=unlocked | Another host may access while bus is inactive. |
| | | 1=locked | Another host shall not access while bus is inactive. |
| | modification_flag | 0=not changed | SD status has not been changed while bus is active. |
| | | 1=changed | SD status has been changed while bus is active. |
| BusHandleSuspend.response | | | |
| | result_code | 0=success | |

F I G. 18

| ReqForBusHandleSuspend.notification | Device PAL requests Host PAL to suspend in unlock mode or terminate bus as another host will start access. |
|---|---|
| ReqForBusHandleTerminate.notification | Device PAL requests Host PAL to terminate bus as another host will start access. |
| BusHandleSuspended.notification | Device PAL notifies that bus is suspended by another host. Host PAL can start or resume bus access if this notification is sent. |
| BusHandleTerminated.notification | Device PAL notifies that bus is terminated by another host. Host PAL can start or resume bus access if this notification is sent. |

F I G. 19

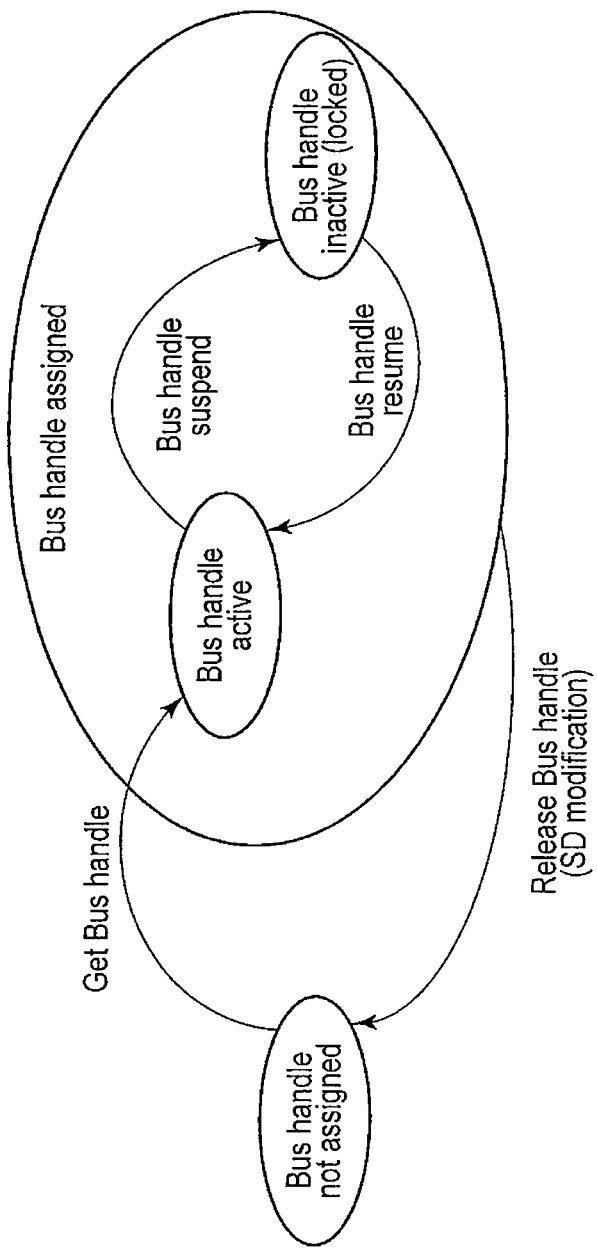
F I G. 20

CONTROLLING ACCESS TO A REMOVABLE MEDIUM FROM A MODULE AND AN EXTERNAL DEVICE

CROSS-REFERENCE TO RELATED APPLICATIONS

This application is based upon and claims the benefit of priority from prior Japanese Patent Application No. 2011-195225, filed Sep. 7, 2011, the entire contents of which are incorporated herein by reference.

FIELD

Embodiments described herein relate generally to an access control apparatus and an access control system, which controls access by a plurality of devices to a removable medium and a built-in storage such as an Embedded SD.

BACKGROUND

Removable media such as SD memory cards and built-in storages such as Embedded SDs have been widely used for storage of image data and video data.

It is required to mount a removable medium simultaneously from a plurality of devices, and enable the devices to access the removable medium.

In addition, it is required to mount a removable medium and a built-in storage such as an Embedded SD simultaneously from a plurality of devices, and enable the devices to access the removable medium.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is a diagram illustrating an example of transition of the state of an SD bus handle.

FIG. 8 is a diagram for explaining access to the SD bus when the SD bus handle is locked by another host.

FIG. 9 is a diagram for explaining a mechanism of notification of change in data which is stored in the SD memory card.

FIG. 10 is a diagram for explaining suspending/resuming the SD bus handle.

FIG. 11 is a diagram for explaining obtaining the SD bus handle by another host while the bus handle is inactive, in the case where there are two hosts.

FIG. 15 is a table for explaining parameters which are used in "GetBusHandle.request" and "GetHusHandle.response", and values of the parameters.

FIG. 16 is a diagram for explaining parameters which are used in "ReleaseBusHandle.request" and "ReleaseBusHandle.response", and values of the parameters.

FIG. 17 is a diagram for explaining parameters which are used in "BusHandleResume.request" and "BusHandleResume.response", and values of the parameters.

FIG. 18 is a diagram for explaining parameters which are used in "BusHandleSuspend.request" and "BusHandleSuspend.response", and values of the parameters.

FIG. 19 is a diagram for explaining notification from the device to the host.

FIG. 20 is a diagram for explaining another example of transition of the state of the SD bus handle.

DETAILED DESCRIPTION

Various embodiments will be described hereinafter with reference to the accompanying drawings.

In general, according to one embodiment, an access control apparatus includes a medium communication module, an access module, a wireless communication module, and a control module. The medium communication module is configured to perform communication with a removable medium. The access module is configured to perform access to the removable medium using the communication module. The wireless communication module is configured to perform wireless communication with a first external device, and to receive access request to the removable medium. The control module is configured to assign an access right to access the removable medium to one of the access module and the first external device, the control module assigns the access right in response to a request of assignment of the access right. The request is transmitted from the first external device or the access module.

Figure 1:
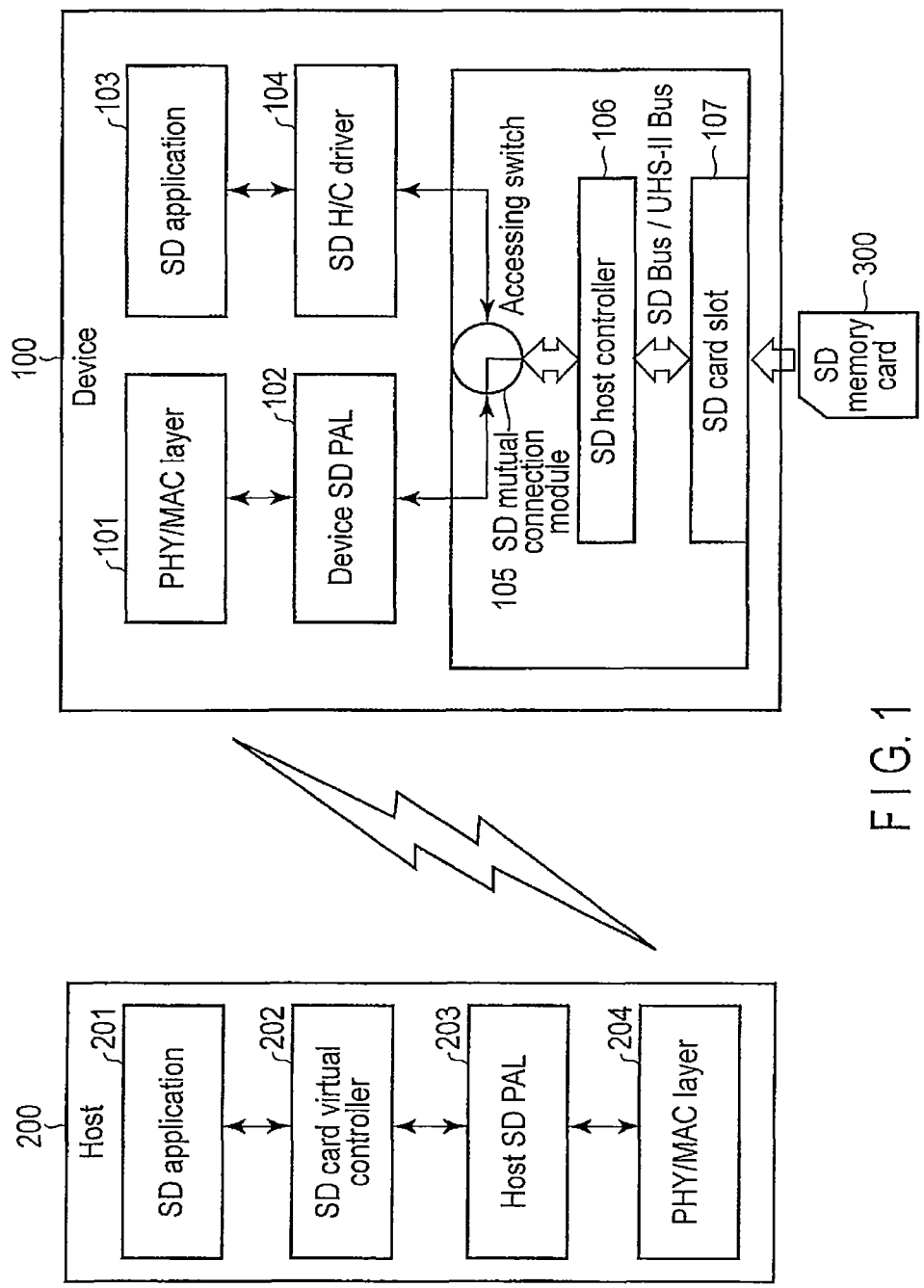
FIG. 1 is a block diagram of an example of a structure of a communication system according to an embodiment.

FIG. 1 is a block diagram illustrating a configuration of a communication system according to an embodiment.

As illustrated in FIG. 1, the communication system is formed of a device 100 and a host 200. The device 100 and the host 200 can transmit data by high-speed wireless communication such as WiFi and WiGig (Wireless Gigabit).

The device 100 comprises a device PHY/MAC layer 101, a device SD PAL (SD Protocol Adaptation Layer) module 102, a device SD application 103, an SD host controller driver 104, an SD interconnection module 105, an SD host controller 106, and an SD card slot 107, and the like.

The device PHY/MAC layer 101 performs high-speed wireless communication such as WiFi and WiGig (Wireless Gigabit), and includes a physical layer and a media access control layer.

A portable removable medium such as an SD memory card 300 is inserted into the SD card slot 107. The SD host controller 106 communicates with the SD memory card inserted into the SD card slot, and performs data transmission with the SD memory card.

The device SD application 103 is an application which accesses the SD memory card 300. The SD H/C driver 104 is software configured to control the SD card host controller 106, and provide the device SD application 103 with an abstract interface.

The device SD PAL module 102 converts commands which are exchanged between the SD card host controller 106 and the host 200. For example, when a command which is suitable for transmission by high-speed wireless communication is received from the host 200, the device SD PAL module 102 converts the command into a command of the SD card standard. In addition, for example, when a response is transmitted from the SD card host controller 106 to the host 200, the device SD PAL module 102 converts the response of the SD card standard into a command which is suitable for transmission by high-speed wireless communication. The SD interconnection module 105 has a function of switching access to the SD memory card 300 between access from the device SD application 103 and access from the SD application 201 of the host 200.

The host 200 comprises a host SD application 201, an SD card virtual controller 202, a host SD PAL module (SD PAL) 203, and a host PHY/MAC layer 204, and the like.

The host PHY/MAC layer 204 performs high-speed wireless communication such as WiGig (Wireless Gigabit), and includes a physical layer and a media access layer. The SD card virtual controller 202 is a virtual controller to enable the host SD application 201 to access data in the SD memory card 300, and converts a command into a command to be transmitted to the host SD PAL module 203. Commands which are suitable for transmission by high-speed wireless communication are transmitted and received between the host SD PAL module 203 and the device SD PAL module.

Figure 2:
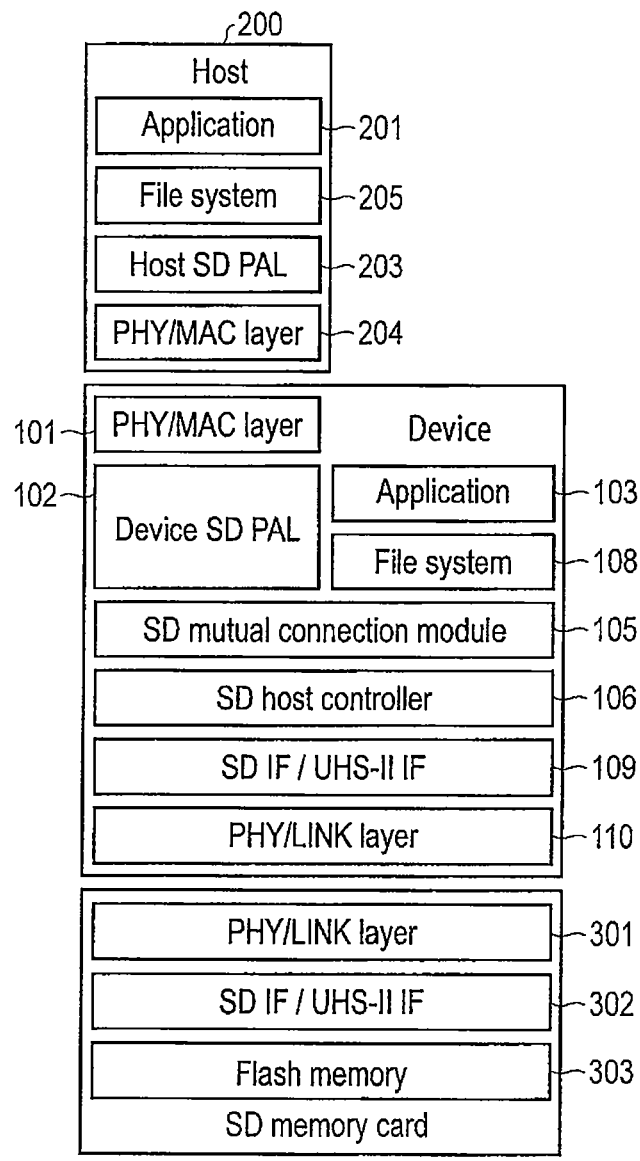
FIG. 2 is a block diagram of an example of an architecture of the communication system of FIG. 1.

Next, an architecture of the communication system will be explained with reference to FIG. 2.

The host 200 comprises a host file system 205, the host SD application 201, the host SD PAL module 203, and the host PHY/MAC layer 204, and the like.

The host file system 205 analyzes a file system which is stored in the SD memory card for writing and reading files in the SD memory card. When the host file system 205 first accesses the SD memory card 300, the host file system 205 caches an FAT (a table to record file position information and the like) stored in the SD memory card, to increase the speed of the access.

The device 100 comprises the device PHY/MAC layer 101, the device SD PAL module 102, the device SD application 103, a device file system 108, the SD interconnection module 105, the SD card host controller 106, a device SD IF/UHS-II IF 109, and a device PHY/LINK layer 110, and the like.

The device file system 108 analyzes the file system which is stored in the SD memory card for reading and writing the files in the SD memory card. When the device file system 108 first accesses the SD memory card 300, the device file system 108 caches the FAT stored in the SD memory card, to increase the speed of the access.

The SD IF/UHS-II IF 109 is an interface which is compliant with the SD standard and the UHS-II standard. The device PHY/LINK layer 110 includes a physical layer and a data link layer.

The SD memory card 300 includes a card PHY/LINK layer 301, a card SD IF/UHS-II IF 302, and a flash memory 303, and the like.

The card PHY-LINK layer 301 includes a physical layer and a data link layer. The card SD IF/UHS-II IF 302 is an interface which is compliant with the SD standard and the UHS-II standard. The flash memory 303 is a non-volatile memory which stores data.

Figure 3:
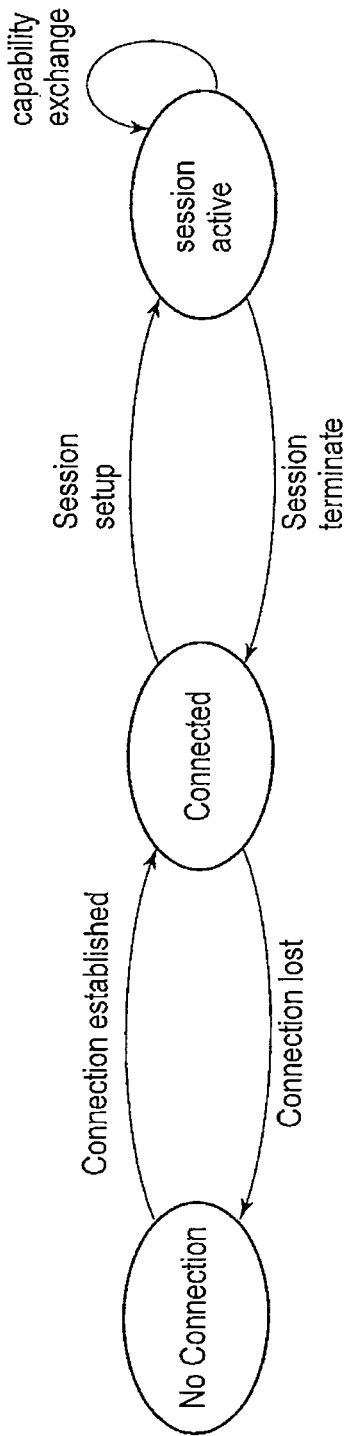
FIG. 3 is a diagram illustrating an example of transition of a session between a device and a host.

Next, transition of a session between the device 100 and the host 200 will be explained hereinafter with reference to FIG. 3.

The state between the device 100 and the host 200 starts from "No connection" in which no communication is performed, and changes to "Connected" through "Connection established". Then, the state "Connected" changes to "Session active" through "Session setup". Next, the state "Session active" changes to "Connected" through "Session terminate". Thereafter, the state "Connected" changes to "No connection" through "Connection lost".

Figure 4:
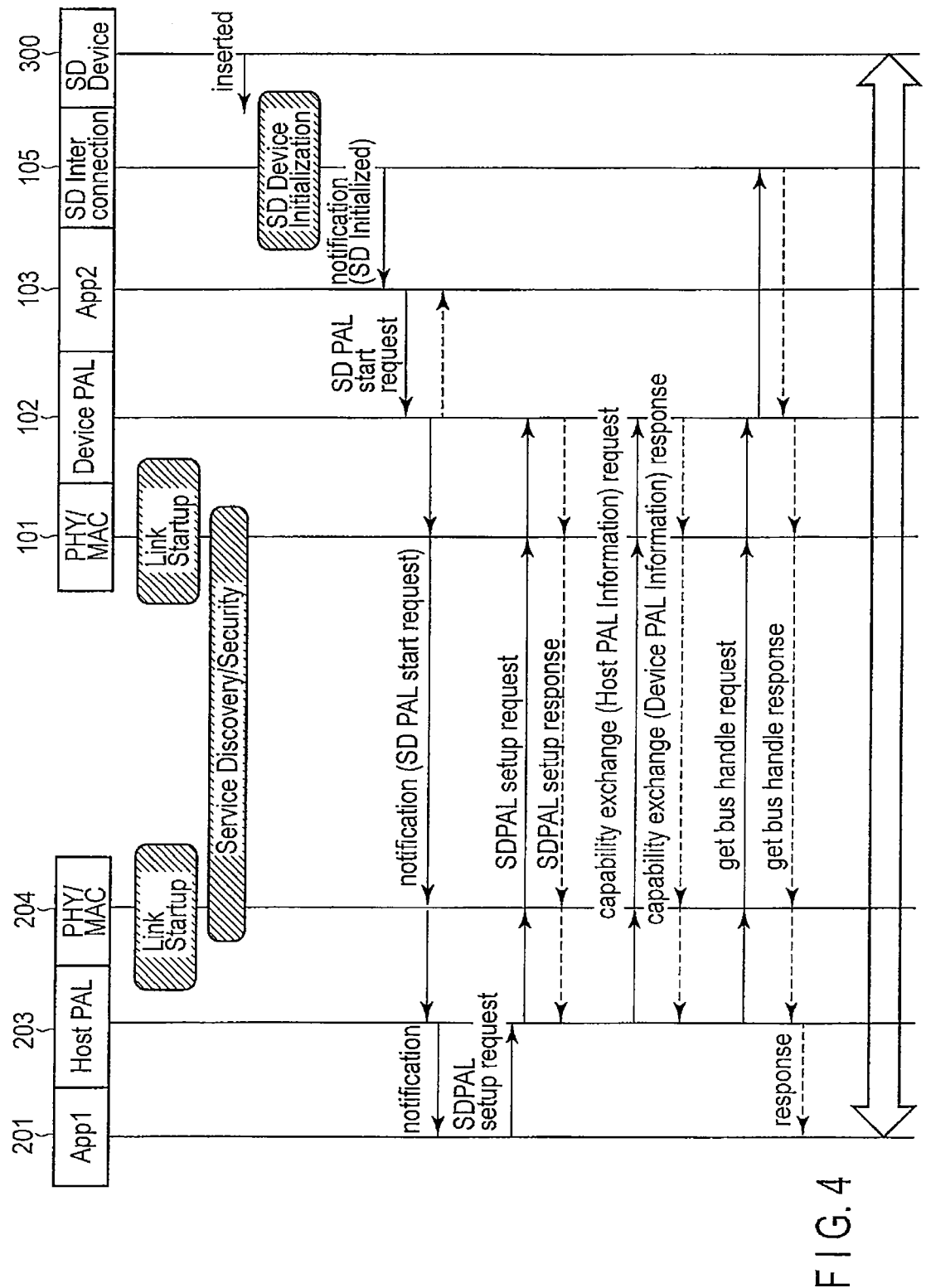
FIG. 4 is a diagram illustrating an example of a process of session setup between the host and the device and of obtaining access right of an SD memory card 300.

Next, a process of "Session setup" to start high-speed wireless communication and start access to the SD memory card 300 from the device and the host will be explained hereinafter, with reference to FIG. 4.

A link to perform wireless communication is started between the host PHY/MAC layer 204 and the device PHY/MAC layer 101 (Link Startup). After start of the link, the communication service finds the layers, and the communication is secured (Service Discovery/Security). When the SD memory card is inserted into the SD card slot, the SD interconnection module 105 initializes the device SD IF/UHS-II IF 109, to enable communication with the SD memory card 300. After initialization, the SD interconnection module 105 notifies the device SD application 103 of initialization of the interfaces (notification (SD initialized)). The device SD application 103 requests the device SD PAL module 102 to start SD PAL (SD PAL start request). The device SD PAL module 102 requests the host SD PAL module 203 to start SD PAL (notification (SD PAL start request)).

The host SD PAL module 203 notifies the host SD application 201 of reception of the SD PAL start request notification (notification). The host SD application 201 transmits the SD PAL start request to the device SD PAL module 102, and requests SD PAL setup. In response to the SD PAL setup request, the device SD PAL module 102 transmits "SD PAL setup response" to the host SD PAL 203.

The host SD PAL module 203 transmits "capability exchange (Host PAL Information) request" to transmit the capability of the host and request the device to transmit the capability of the device, to the device SD PAL module 102, together with information such as a buffer size which is the capability of the host. In response to reception of the capability exchange request, the device SD PAL module 102 transmits "capability exchange response", which indicates the capacity of the SD memory card 300 and the capability of the corresponding standard, to the host SD PAL module 203.

The host SD PAL module 203 transmits a "get bus handle request" to the device SD PAL module 102, to request a right to access the SD device which can be accessed by the device SD IF/UHS-II IF 109. In response to reception of the "get bus handle request", the device SD PAL module 102 sends an inquiry to the SD interconnection module 105 about whether a right to access the SD card by the host 200 can be obtained. In response to the inquiry, when the right to access is permitted, the SD interconnection module 105 notifies the device SD PAL module 102 that the access is permitted. The device SD PAL module 102 transmits a get bus handle response to the host SD PAL module 203. The host SD PAL module 203 notifies the host SD application 201 that a bus handle has been obtained.

Next, transition of a state of an SD bus handle (access right) of the host 200 will be explained hereinafter with reference to FIG. 5.

The state "Bus handle not assigned" is a state in which no SD bus handle is assigned to the host 200. In this state, the host 200 cannot access the SD bus or the SD memory card (SD device) 300, while the device 100 can access the SD bus and the SD memory card (SD device) 300. When the host 200 obtains an SD bus handle (Get Bus handle), the SD bus handle for the host 200 changes from the state "Bus handle not assigned" to "Bus active". In the active state, the host 200 can access the SD bus and the SD device.

When the SD bus handle is suspended, the SD bus handle for the host 200 changes from the active state (Bus handle active) to the inactive (invalid) state (Bus handle inactive). In the inactive state, the host 200 temporarily releases the right to access the SD bus and the SD device, and the device 100 can access the SD bus and the SD device. When the SD bus is resumed in the inactive state of the bus handle, the state of the SD bus handle is changed from the inactive state (Bus handle inactive) to the active state (Bus handle active). When data in the SD memory card 300 has been changed during the inactive state, the host 200 is notified of the data change.

When the SD bus is suspended in the locked mode, the SD bus handle is changed from the active state (Bus handle active) to a locked inactive state (Bus handle inactive (locked)). In the locked inactive state, although the host 200 temporarily releases the right to access the SD bus and the SD device, the device 100 cannot locally access the local SD bus and the SD device. When the SD bus handle is resumed, the SD bus handle changes from the locked inactive state to the active state.

The active state, the inactive state, and the locked inactive state are states in which the bus handle is assigned to the host 200 (Bus assigned).

Next, the case where another host requests access to the SD bus when the SD bus handle is in the inactive state will be explained hereinafter with reference to FIG. 6. In the following explanation, the device 100 is also referred to as local host (LH) 100, and the host 200 is also referred to as remote host (RH) 200.

Figure 6:
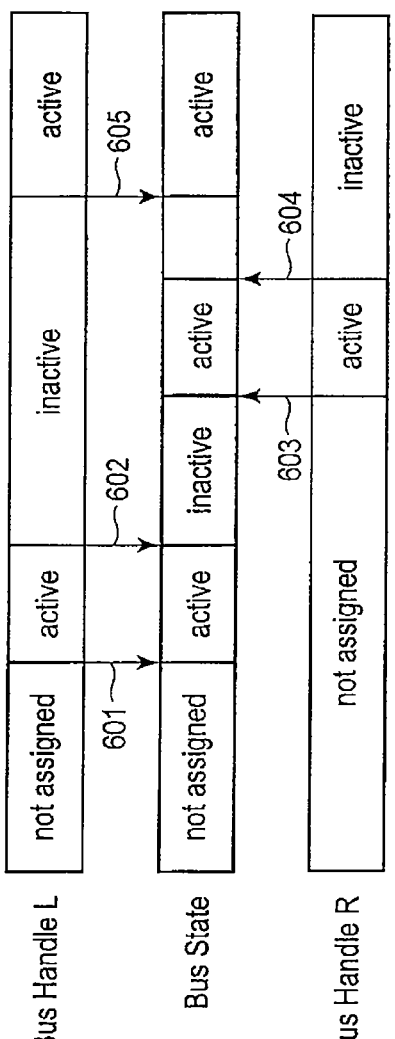
FIG. 6 is a diagram for explaining access to an SD bus when the SD bus handle is not locked.

In FIG. 6, the item "Bus Handle L" indicates the state of the SD bus handle for the local host 100, the item "Bus state" indicates the state of the SD bus handle, and the item "Bus Handle R" indicates the state of the SD bus handle for the remote host 200.

In the first state, since the SD memory card 300 is not inserted into the SD card slot 107, the SD bus cannot be used. The right to access the SD bus is assigned to neither the local host nor the remote host. After the SD memory card 300 is inserted into the SD card slot 107 and the SD bus is initialized by the local host 100 (Block 601), the SD bus is changed to the active state, and the SD bus handle is assigned to the local host 100.

When the local host 100 (device SD application 103) suspends the SD bus handle, assignment of the SD bus to the local host 100 is inactivated, and the SD bus is changed to the inactive state (Block 602). The SD bus may be changed to a power-saving mode.

When the remote host 200 (host SD application 201) starts access to the SD memory card 300, the state of SD bus handle for the remote host 200 (host SD application 201) is changed to the active state, and the state of SD bus changes from the inactive state to the active state (Block 603).

When the remote host 200 (host SD application 201) suspends the SD bus handle, the SD bus handle for the remote host 200 is inactivated, and the state of SD bus changes to the inactive state (Block 604).

When the local host 100 (device SD application 103) resumes access to the SD memory card 300, the state of SD bus handle for the local host 100 is changed to the active state, and the state of SD bus handle changes from the inactive state to the active state (Block 605).

The SD interconnection module 105 determines whether the SD bus handle is to be switched to the active state or the inactive state.

Next, access to the SD bus while the SD bus is activated by the local host 100 will be explained hereinafter with reference to FIG. 7.

Figure 7:
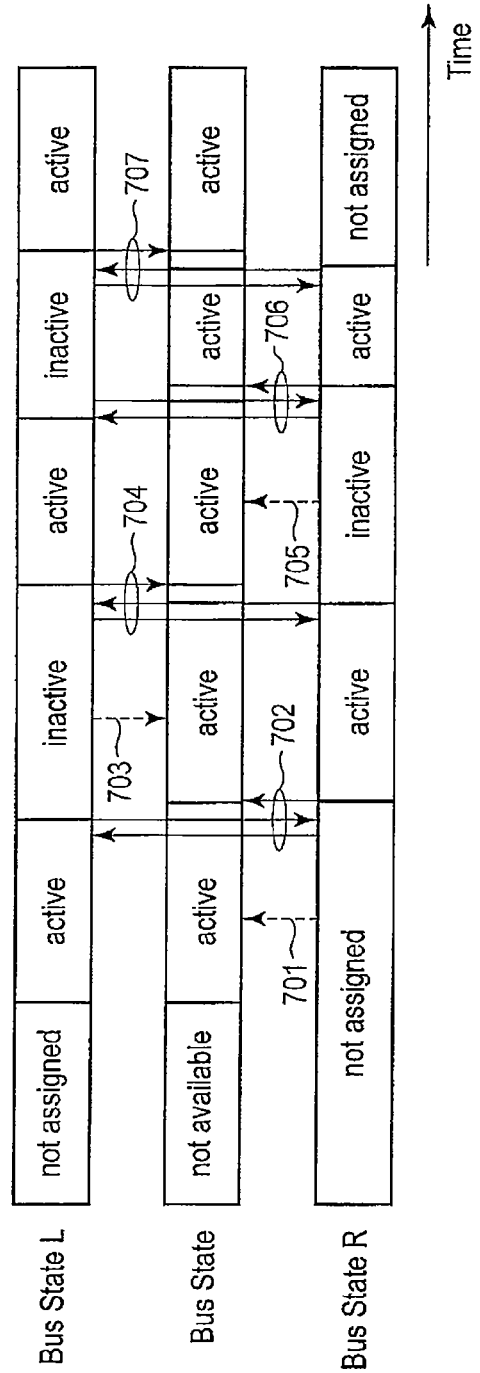
FIG. 7 is a diagram for explaining access to the SD bus when another host accesses the SD bus.

In FIG. 7, the item "Bus State L" indicates the state of the SD bus handle for the local host 100, the item "Bus State" indicates the state of the SD bus, and the item "Bus State R" indicates the state of the SD bus handle for the remote host 200.

In the first state, since the SD memory card 300 is not inserted into the SD card slot 107, the SD bus cannot be used. The SD bus handle is assigned to neither the SD bus to the local host nor the remote host. After the SD memory card 300 is inserted into the SD card slot 107 and the SD bus is initialized by the local host 100, the SD bus is changed to the active state, and the SD bus handle is assigned to the local host 100.

Block 701: In the state where the local host 100 has the right to access the SD memory card 300, the remote host 200 attempts to obtain the SD bus handle. Since the local host 100 is accessing the SD memory card 300, the attempt of the remote host 200 ends in failure.

Block 702: The remote host 200 attempts to obtain the SD bus handle, on condition that the remote host 200 requests the local host 100 to abandon the access right when the local host 100 has the right to access the SD memory card. The SD interconnection module 105 notifies the local host 100 to suspend or stop access to the SD bus. The local host 100 performs access to the SD bus until the task comes to the state of being able to be suspended, and suspends the SD bus handle when the task comes to a stage which can be suspended. The remote host 200 is notified by the SD interconnection module 105 that the SD bus has changed to the state which can be used. The remote host 200 makes a request to obtain the SD bus handle again, and obtains the right to access the SD bus.

Block 703: In the state where the remote host 200 has the right to access the SD memory card, the local host 100 attempts to obtain the SD bus handle. In the attempt, the local host 100 is not permitted to obtain the SD bus handle, and a request to obtain the SD bus handle for the local host 100 ends in failure.

Block 704: The local host 100 attempts to obtain the SD bus handle, on condition that the local host 100 requests the remote host 200 to abandon the right when the remote host 200 has the right to access the SD memory card 300. The local host and the SD interconnection module 105 notify the remote host 200 to suspend or stop access to the SD bus. The remote host 200 performs access to the SD bus until the task comes to the state of being able to be suspended, and suspends the SD bus handle when the task comes to a stage which can be suspended. The local host 100 is notified by the SD interconnection module 105 that the SD bus has changed to the state which can be used. The local host 100 makes a request to obtain the SD bus handle again, and obtains the right to access the SD bus.

Block 705: In the state where the local host 100 has the right to access the SD memory card, the remote host 200 attempts to obtain the SD bus handle. Obtaining the SD bus handle by the local host 100 ends in failure.

Block 706: The remote host 200 attempts to resume the SD bus handle, on condition that the remote host 200 requests the local host 100 to abandon the right when the local host 100 has the right to access the SD memory card. The SD interconnection module 105 notifies the local host 100 to suspend or stop the SD bus handle. The local host 100 performs access to the SD bus until the task comes to the state of being able to be suspended or stopped, and suspends the SD bus handle when the task comes to a stage which can be suspended. The remote host 200 is notified by the SD interconnection module 105 that the SD bus has changed to the state which can be used. The remote host 200 makes a request to resume the SD bus handle again, and obtains the right to access the SD bus.

Block 707: The local host 100 attempts to resume the SD bus handle, on condition that the local host 100 requests the remote host 200 to abandon the right when the remote host 200 has the right to access the SD memory card. The SD interconnection module 105 notifies the remote host 200 to suspend or stop the SD bus handle. The remote host 200 performs access to the SD bus until the task comes to the state of being able to be suspended or stopped, and a request to end the SD bus handle is performed when the task comes to a stage which can be suspended. The local host 100 is notified by the SD interconnection module 105 that the SD bus has changed to the state which can be used. The local host 100 resumes the SD bus handle, and obtains the right to access the SD bus again.

Next, access to the SD bus while the SD bus is locked will be explained hereinafter with reference to FIG. 8.

In FIG. 8, the item "Bus State L" indicates the state of the SD bus handle for the local host 100, the item "Bus State" indicates the state of the SD bus, and the item "Bus State R" indicates the state of the SD bus handle for the remote host 200.

In the first state, since the SD memory card 300 is not inserted into the SD card slot 107, the SD bus cannot be used. The SD bus handle is assigned to neither the local host 100 nor the remote host 200. After the SD memory card 300 is inserted into the SD card slot 107 and the SD bus is initialized by the local host 100, the SD bus is changed to the active state, and the SD bus handle is assigned to the local host 100.

Block 801: The local host 100 suspends the SD bus handle in the locked mode. The SD bus changes to the locked mode in which the SD bus cannot be accessed. The SD bus may be changed to a power-saving mode.

Block 802: The remote host 200 attempts to obtain the SD bus handle. Since the SD bus handle is locked by the local host 100, the remote host cannot obtain the SD bus handle. The remote host 200 is notified from the SD interconnection module 105 that the SD bus is in the locked mode.

Block 803: The remote host 200 attempts to obtain the SD bus handle, on condition that the remote host 200 requests the local host 100 to abandon the right when the local host 100 has the right to access the SD bus handle. The SD interconnection module 105 requests the local host 100 to unlocked or stop the SD bus handle. The local host 100 first activates the SD bus handle, performs access to the SD bus until the SD bus may be accessed by the remote host, and suspends the SD bus handle when the task comes to a stage which can be suspended. The remote host 200 is notified by the SD interconnection module 105 that the SD bus has changed to the state which can be used. The remote host 200 makes a request to obtain the right to access the SD bus again, and the SD bus handle for the remote host is activated. In addition, the SD bus is also changed to the active state.

Block 804: The remote host 200 suspends access to the SD bus in the locked mode. The SD bus changes to the locked mode in which the SD bus cannot be accessed. The SD bus handle for the remote host changes to the inactive state in the locked mode. The SD bus changes to the inactive state. The SD bus may be changed to the power-saving mode.

Block 805: The local host 100 attempts to obtain the SD bus handle. Since the SD bus handle is locked by the remote host 200, the local host 100 cannot obtain the SD bus handle. The local host 100 is notified from the SD interconnection module 105 that the SD bus is in the locked mode.

Block 806: The local host 100 attempts to resume the SD access, by setting a notification flag to request the remote host to transfer the right to access the SD bus when the remote host has the access right. The SD interconnection module 105 requests the remote host 200 to release the access right. The remote host 200 first activates the SD bus handle, performs access to the SD bus until the SD bus may be accessed by the local host, and terminates the SD bus handle when the task comes to a stage which can be suspended. The local host 100 is notified by the SD interconnection module 105 that the SD bus has changed to the state which can be used. The local host 100 makes a request to resume the SD bus handle again, which succeeds this time, and obtains the access right again. In addition, the SD bus is also changed to the active state.

Next, an operation which is performed when data stored in the SD memory card 300 is changed will be explained hereinafter with reference to FIG. 9.

In FIG. 9, the item "Bus State L" indicates the state of the SD bus handle for the local host 100, the item "Bus state" indicates the state of the SD bus, and the item "Bus State R" indicates the state of the SD bus handle for the remote host 200.

In the first state, since the SD memory card 300 is not inserted into the SD card slot 107, the SD bus cannot be used. The SD bus handle is assigned to neither the local host 100 nor the remote host 200. After the SD memory card 300 is inserted into the SD card slot 107 and the SD bus is initialized by the local host 100, the SD bus is changed to the active state, and the SD bus handle is assigned to the local host 100.

Block 901: When the local host 100 suspends the SD bus handle and data in the SD memory card is changed (update, addition, or deletion of data) during the active state, the local host 100 notifies the SD interconnection module 105 of the change of the data.

The remote host 200 obtains the SD bus handle, and accesses the SD bus.

Block 902: The remote host 200 suspends the SD bus handle. When data in the SD memory card is changed during the active state, the remote host 200 notifies the SD interconnection module 105 of the change of the data. The SD bus handle for the remote host 200 is inactivated.

Block 903: When the local host 100 obtains the SD bus handle and the data in the SD memory card is changed during the inactive state, the local host 100 is notified by the SD interconnection module 105 of the change of the data. When the data in the SD memory card is changed, the device file system 108 of the local host clears the cache of the FAT, and obtains the FAT from the SD memory card 300 again.

Block 904: The remote host 200 requests resuming of the SD bus handle. The local host is notified of a request to suspend or terminate the SD bus handle. When the local host 100 is requested to suspend or terminate the SD bus handle, the local host 100 continues the SD access until no problem is caused by suspending the SD bus handle, and makes a request to suspend the SD bus handle when the task comes to a stage which can be suspended. When the local host 100 makes a request to suspend the SD bus handle, the local host 100 transmits information which indicates whether data in the SD memory card is changed or not to the SD interconnection module 105. The SD interconnection module 105 notifies the remote host that the bus handle has come to the usable state. The remote host attempts to obtain the SD bus handle again, and the attempt succeeds. In the attempt, the remote host 200 obtains information, which indicates whether the data in the SD memory card has been changed during the inactive state, from the SD interconnection module 105. When the data in the SD memory card is changed, the host file system 205 of the remote host clears the cache of the FAT, and obtains FAT data from the SD memory card 300 again.

Block 905: When the remote host 200 is requested to suspend or terminate the SD bus handle, the remote host 200 continues the SD access until no problem is caused by suspending the SD bus handle, and makes a request to suspend the SD bus handle when the task comes to a stage which can be suspended. When the remote host 200 makes a request to suspend the SD bus handle, the remote host 200 transmits information which indicates whether data in the SD memory card is changed or not to the SD interconnection module 105. When the local host 100 obtains the SD bus access again and the data in the SD memory card has been changed during the inactive state, the local host 100 is notified of the change from the SD interconnection module 105. When the data in the SD memory card is changed, the device file system 108 of the local host clears the cache of the FAT, and obtains FAT from the SD memory card 300.

Next, suspending/resuming of the SD bus handle will be explained hereinafter with reference to FIG. 10.

The host SD application 201 is accessing the SD memory card (Block 1001). The host SD application 201 transmits "BusHandleSuspend.req" to suspend the SD bus handle to the SD interconnection module 105 (Block 1002).

After transmission of "BusHandleSuspend.req", the SD bus is suspended (inactive state). While the SD bus is in the inactive state, the device PHY/MAC layer 101 and the SD bus may be changed to the power-saving mode. While the SD bus is in the inactive state, the host PHY/MAC layer 204 may be changed to the power-saving mode.

The host SD application 201 transmits "BusHandleResume.req" to resume the SD bus handle to the SD interconnection module 105 (Block 1003). At this block, the device PHY/MAC layer, the SD bus, and the host PHY/MAC layer are restored from the power-saving mode. The SD interconnection module 105 resumes the SD bus handle. After the SD bus is resumed, the host SD application 201 accesses the SD memory card 300 (Block 1004).

Next, permitting the SD bus handle by another host while the bus is in the inactive state in the case where there are two hosts will be explained hereinafter with reference to FIG. 11.

A second host 200B is accessing the SD memory card 300 (Block 1101). The second host SD application 201B transmits "BusHandleSuspend.req" to suspend the SD bus handle to the SD interconnection module 105 (Block 1102). When the second host has changed the data in the SD memory card, the "modification_flag" in the "BusHandleSuspend.req" is changed to a value which indicates the change. The device PHY/MAC layer may be changed to the power-saving mode. In addition, the SD bus may be changed to the power-saving mode, while the SD bus is suspended by all the hosts.

While the SD bus is in the inactivate inactive state, a first host SD application 201A transmits "BusHandleResume.req" to resume the SD bus to the SD interconnection module 105 (Block 1103). After the SD bus handle changes to the active state, the SD interconnection module 105 transmits "BusHandleResume.res", which indicates that the bus is activated, to the first host SD application 201A (Block 1104). The SD interconnection module 105 changes a "modification_flag" in the "BusHandleResume.res" to a value which indicates the change, and notifies the first host SD application 201A whether the data in the SD memory card has been changed during the inactive state. When the "modification_flag" has a value which indicates change, the file system 205A is required to delete the cache data of the FAT, and obtain FAT data again from the SD memory card. The first host SD application 201A accesses the file in the SD memory card (Block 1105).

The first host SD application 201A transmits "BusHandleSuspend.req" to suspend the SD bus handle to the SD interconnection module 105 (Block 1106). When the first host SD application 201A has changed the data in the SD memory card, the "modification_flag" in the "BusHandleSuspend.req" is changed to a value which indicates the change, and the SD interconnection module 105 is notified that the data in the SD memory card has been changed. The SD bus changes to the inactive state. The device PHY/MAC layer 101, the first host PHY/MAC layer 204A, and the SD bus may be changed to the power-saving mode. They are released from the power-saving mode when the next resume request arrives.

While the SD bus is in the inactive state, a second host SD application 201B transmits "BusHandleResume.req" to resume the SD bus to the SD interconnection module 105 (Block 1107). After the SD bus handle changes to the active state, the SD interconnection module 105 transmits "BusHandleResume.res", which indicates that the SD bus is activated, to the second host SD application 201B (Block 1108). When the data in the SD memory card has been changed during the inactive state, the SD interconnection module 105 changes a "modification_flag" in the "BusHandleResume.res" to a value which indicates the change, and notifies the file system 205B of the change. When the "modification_flag" has a value which indicates change, the file system 205B deletes the cache data of the FAT. The second host SD application 201B accesses the file in the SD memory card (Block 1109).

Figure 12:
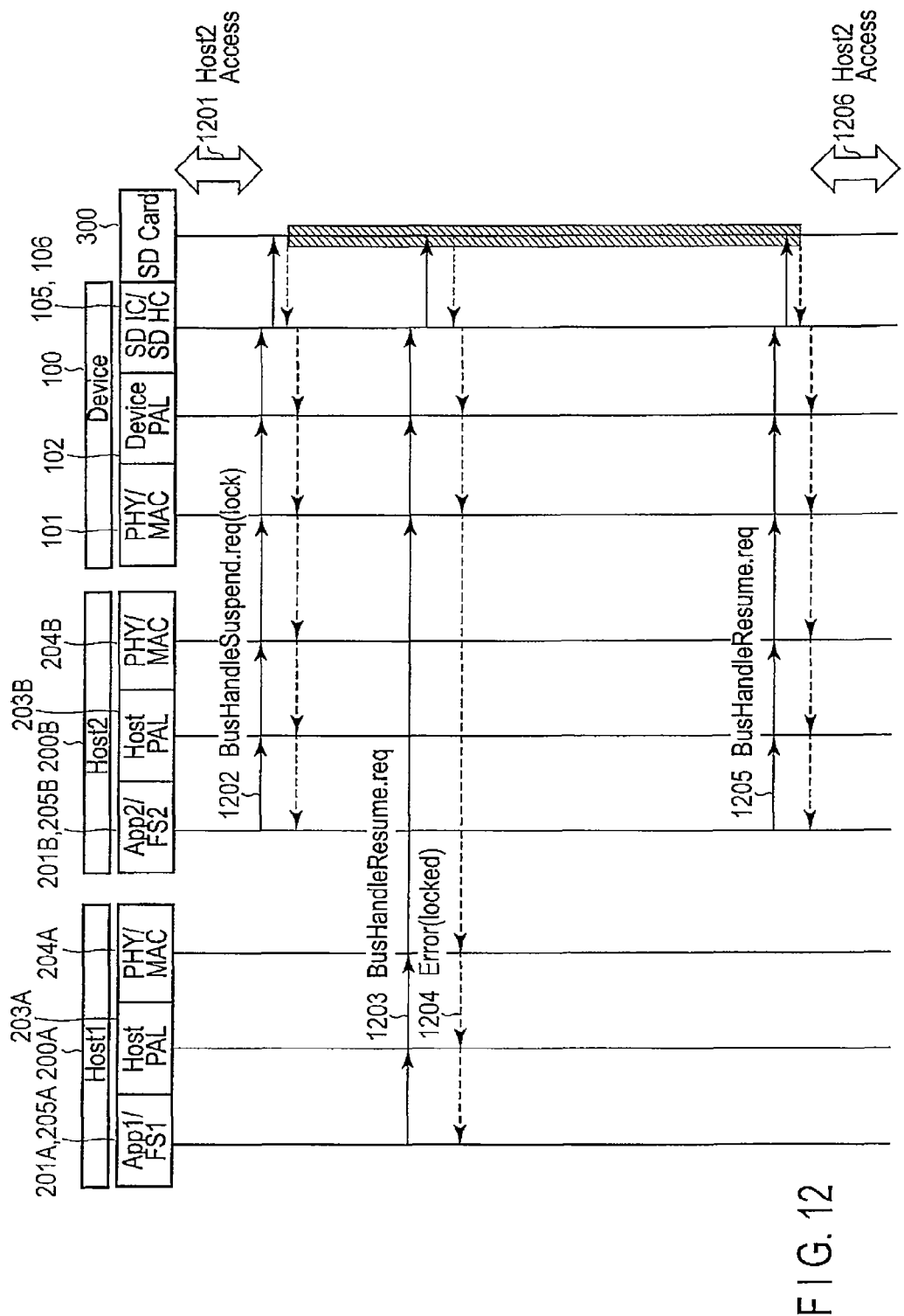
FIG. 12 is a diagram for explaining that a first host cannot access the SD bus when the SD bus handle state is locked inactive state by a second host, when there are two hosts.

Next, changing the SD bus handle to the locked inactive state while the second host is in the inactive state in the case where there are two hosts will be explained hereinafter with reference to FIG. 12.

The second host SD application 201B is accessing the SD memory card 300 (Block 1201). When the SD bus handle is to be suspended and the first host 200A is not permitted to access files in the SD memory card, the second host SD application 201B transmits "BusHandleSuspend.req (lock)" to suspend the SD bus handle in the lock mode to the SD interconnection module 105 (Block 1202).

While the SD bus is in the inactive state, the first host SD application 201A transmits "BusHandleResume.req" to resume the SD bus handle to the SD interconnection module 105 (Block 1203). Since the SD bus is in the locked inactive state, the SD interconnection module return "error (locked)" to the first host SD application 201A (Block 1204). When the SD bus is locked by the second host SD application 201B, the first host SD application 201A cannot resume the SD bus handle.

To unlock the SD bus handle by the second host SD application 201B transmits, the second host SD PAL 203B transmits "BusHandleResume.req" to resume the SD bus to the SD interconnection module 105 (Block 1205). The SD interconnection module 105 activates the SD bus. The second host SD application 201B obtains the SD bus handle, and accesses the files in the SD memory card (Block 1206).

Figure 13:
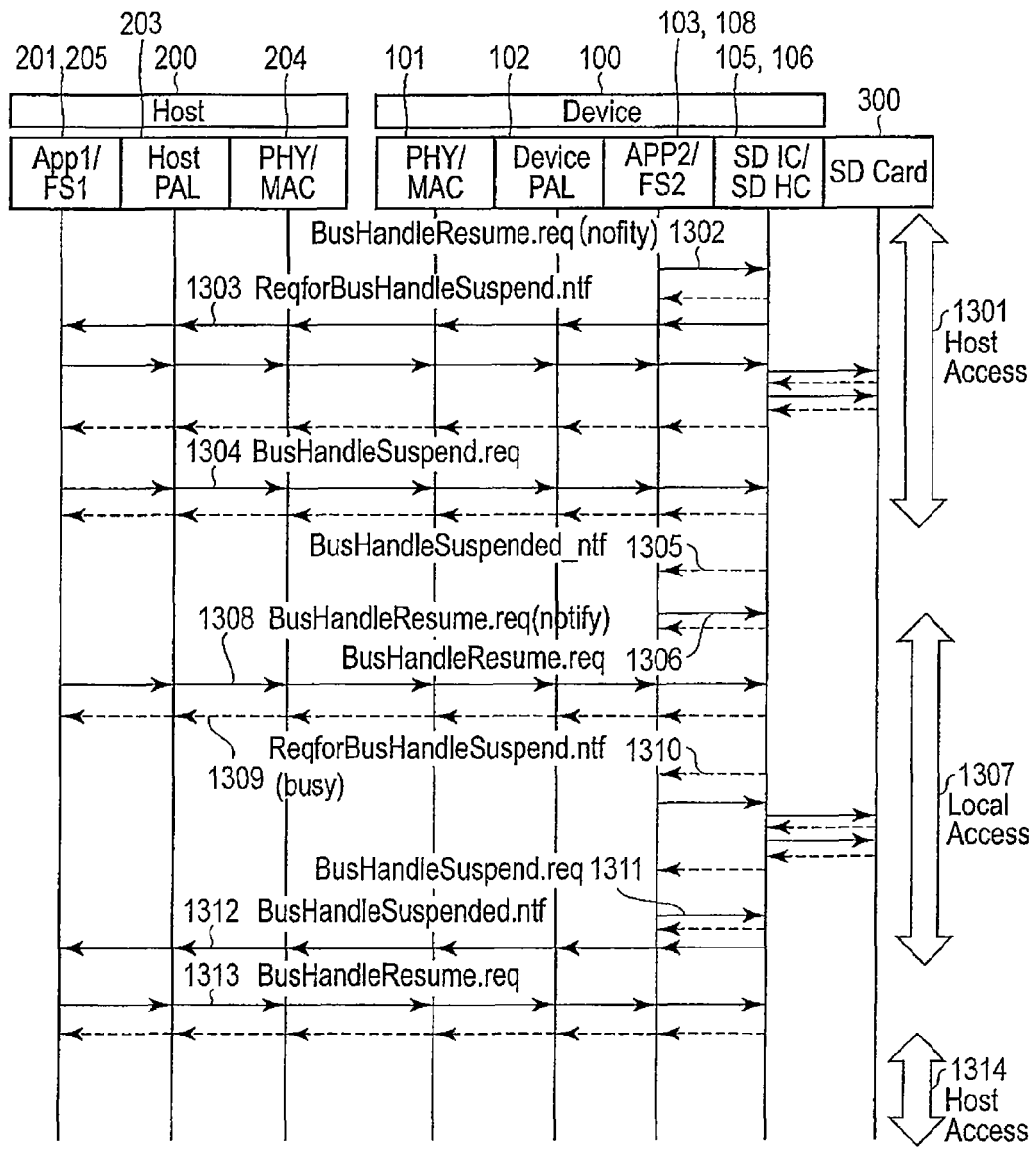
FIG. 13 is a diagram for explaining resuming the SD bus handle in a state where another host is accessing the SD bus.

Next, resuming the SD bus in the state where another host is accessing the SD bus will be explained hereinafter with reference to FIG. 13.

The device 100 is accessing the files in the SD memory card (Block 1301). The device SD application 103 transmits "BusHandleResume.req" to resume the SD bus to the SD interconnection module 105 (Block 1302). Since the SD bus handle for the device 100 is activated, resuming the SD bus ends in failure. The SD interconnection module 105 transmit "ReqforBusHandleSuspend.ntf", which indicates that a request to suspend the SD bus has been received from another device, to the device SD application 103 (Block 1303). When the device SD application 103 receives the "ReqforBusHandleSuspend.ntf", the host SD PAL module 203 continues processing to access the SD memory card 300 by the device SD application 103 until a state in which the processing can be suspended, and thereafter transmits "BusHandleSuspend.req" to suspend the SD bus.

The host SD application 201 transmits "BusHandleResume.req" to resume the SD bus handle to the SD interconnection module (Block 1304).

The SD interconnection module 105 transmits "BusHandleSuspended_ntf", which indicates that the SD bus handle has been suspended, to the device SD application 103 (Block 1305).

The device SD application 103 transmits "BusHandleResume.req" to resume the SD bus handle to the SD interconnection module 105 (Block 1306). The device SD application 103 obtains the SD bus handle, and thereafter accesses the files in the SD memory card (Block 1307).

When the host SD PAL module 203 is required to resume the SD bus handle even when the SD bus is used by the local host, the host SD PAL module 203 transmits "BusHandleResume.req" to the SD interconnection module, and also requests them to notify thereof (Block 1308). In response to the "BusHandleResume.req", the SD interconnection module 105 returns "busy" which indicates that the SD bus handle is accessed since the device uses the SD bus (Block 1309). Since the notification request is received, the SD interconnection module 105 transmits "ReqForBusHandleSuspend_ntf", which indicates that a request to suspend the SD bus is received from another device, to the device SD application 103 (Block 1310). The device SD application 103 continues the access to the SD bus until a state in which the access may be suspended, and thereafter transmits "BusHandleSuspend.req" to suspend the SD bus to the SD interconnection module 105 (Block 1311).

After the SD bus handle is suspended, the SD interconnection module 105 transmits "BusHandleSuspended_ntf", which indicates that the SD bus handle is suspended, to the host SD application 201 (Block 1312). The host SD application 201 transmits "BusHandleResume.req" to resume the SD bus handle to the SD interconnection module 105 (Block 1313). The SD interconnection module 105 resumes the SD bus handle. The host SD application 201 obtains the SD bus handle, and thereafter accesses the files in the SD memory card 300 (Block 1314).

Figure 14:
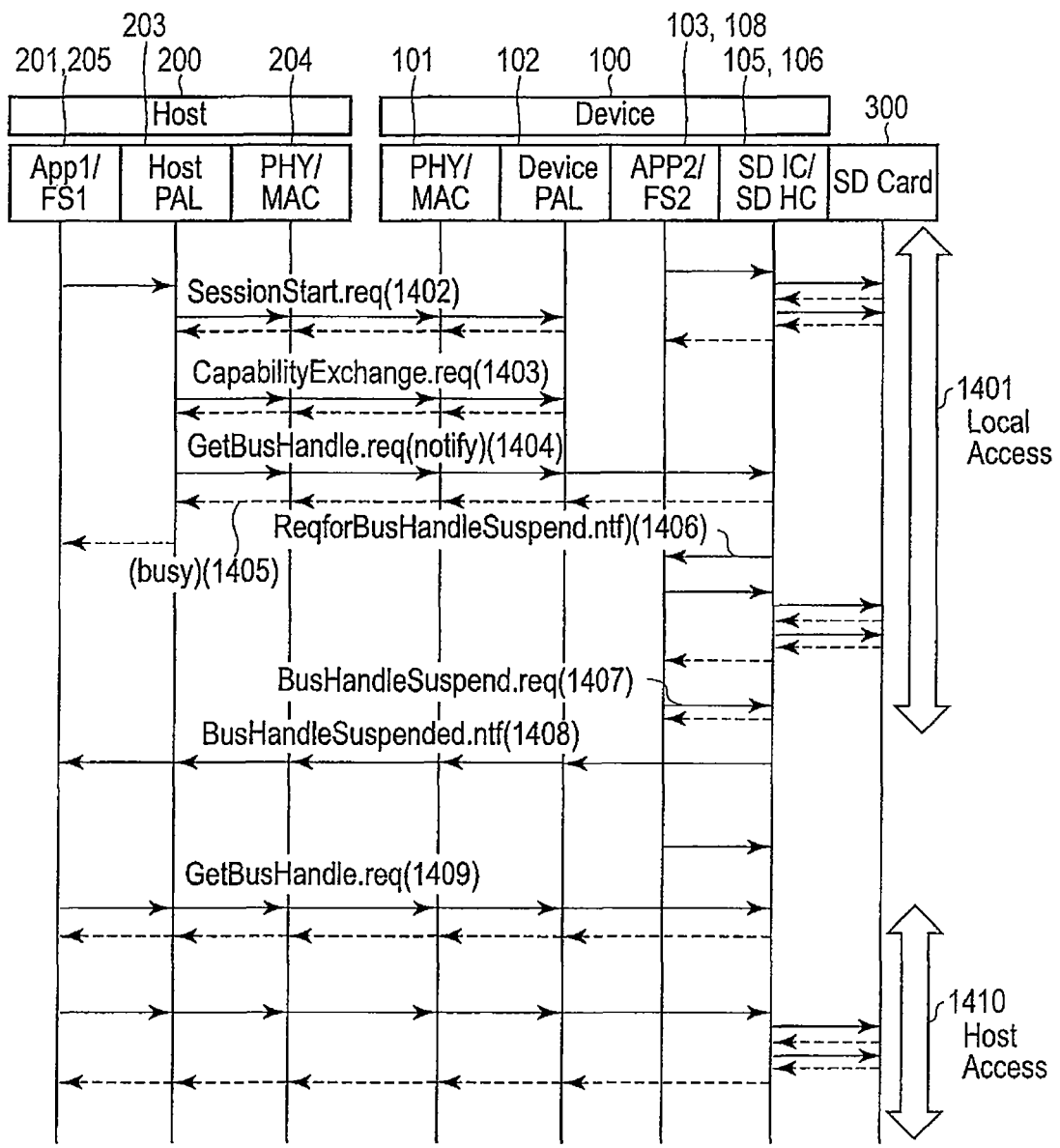
FIG. 14 is a diagram for explaining setup of an SD PAL session in a state where another host is accessing the SD bus.

Setup of an SD PAL session while the host accesses the SD bus handle will be explained hereinafter with reference to FIG. 14.

The device 100 is accessing the files in the SD memory card (Block 1401). The host SD PAL module 203 transmits "SessionStart.req" to request start of an SD PAL session to the device SD PAL module (Device PAL) 102 (Block 1402). The host SD PAL module 203 transmits "CapabilityExchange.req" to request transmission of capability of the SD memory card 300 and the like to the device SD PAL module 102 (Block 1403). In response to the "CapabilityExchange.req", the device SD PAL module 102 returns a response. The host SD PAL module 203 transmits "GetBusHandle.req (notify)" to request to obtain the SD bus handle to the SD interconnection module 105 (Block 1404). Since the device 100 is using the SD bus, the SD interconnection module 105 transmits "(Busy)" to the host SD PAL module 203 (Block 1405). The SD interconnection module 105 transmits "ReqforBusHandleSuspend.ntf", which indicates a request to suspend the SD bus is received from another device, to the device SD application 103 (Block 1406). The device SD application 103 continues the access to the SD bus until a state in which the access may be suspended, and thereafter transmits "BusHandleSuspend.req" to suspend the SD bus handle to the SD interconnection module 105 (Block 1407). After the SD bus handle is inactivated, the SD interconnection module 105 transmits "BusHandleSuspended.ntf" to the host SD application 201 to notify the host SD application 201 that the state of SD bus handle is in the inactive state (Block 1408).

The host SD application 201 transmits "GetBusHandle.req (notify)" to request to obtain the SD bus handle to the SD interconnection module 105 (Block 1409). The state of the SD bus handle is activated, and the host SD application 201 accesses the files in the SD memory card (Block 1410).

Next, commands which are exchanged between the host and the SD interconnection module 105 will be explained hereinafter.

A command "GetBusHandle.request" which is transmitted from the host SD PAL module 203 to the SD interconnection module 105, and a command "GetBusHandle.response" which is transmitted from the SD interconnection module 105 to the host SD PAL module 203 in response to reception of the "GetBusHandle.request" will be explained hereinafter (FIG. 15).

The command "GetBusHandle.request" is a command which requests to obtain the SD bus handle. When the command "GetBusHandle.request" is transmitted, "request_level" is set. The active range of the "request_level" is 0 or 1. When the value of the "request_level" is 0 (=if available), the host SD PAL module 203 requests obtaining the SD bus handle, when the SD bus handle can be obtained. When the value of the "request_level" is 1 (=notify required), the host SD PAL module 203 requests the host which is accessing the SD bus to suspend the SD bus handle such that the host SD PAL module 203 can obtain the bus handle, and requests notification that the bus handle has come to be usable.

The command "GetHandle.response" is a response to "GetBusHandle.request". The command "GetHandle.response" includes "result_code". The "request_level" has a value of 0, 1, or 2. The value "0" (=success) of the "request_level" means that obtaining the SD bus succeeds by the host SD PAL module 203, and the SD bus handle is activated. The value "1" (=error_busy) of the "request_level" means that the SD bus has already been activated by another host. The value "2" (=error_locked) of the "request_level" means that the SD bus is locked by another host.

A command "ReleaseBusHandle.request" which is transmitted by the host SD application to the SD interconnection module 105, and a command "ReleaseBusHandle.response" which is transmitted from the SD interconnection module 105 to the host SD application in response to reception of the "ReleaseBusHandle.request" will be explained hereinafter (FIG. 16).

The command "ReleaseBusHandle.request" is a command which requests release of the SD bus handle when the SD bus handle is assigned to the host. The command "ReleaseBusHandle.request" includes "modification_flag". The "modification_flag" has a value of 0 or 1. The value "0" (=not changed) of the "modification_flag" means that the structure of the file has not been changed while the SD bus handle is activated.

The value "1" (=changed) of the "modification_flag" means that the structure of the file has been changed while the SD bus handle is activated.

The command "ReleaseBusHandle.response" is a response to "ReleaseBusHandle.request". The "ReleaseBus- Handle.response" includes "result_code". The "result_code" has a value of 0 which means success in release of the SD bus handle.

Next, a command "BusHandleResume.request" which is transmitted from the host SD application to the SD interconnection module 105, and a command "BusHandleResume.response" which is transmitted from the SD interconnection module 105 to the host SD application in response to reception of the "BusHandleResume.request" will be explained hereinafter (FIG. 17).

The command "BusHandleResume.request" is a command to request resuming the SD bus. When the bus is locked by the host SD PAL module 203, only the host SD PAL module 203 which suspended the bus in the lock mode can transmit only the "BusHandleResume.request". When the bus is not locked, any host SD PAL module 203 can transmit only the "BusHandleResume.request".

The "BusHandleResume.request" includes "request_level". The "request_level" has a value of 0 or 1. When the value of the "request_level" is "0" (=if available), the host SD PAL module 203 requests the SD bus handle from the SD interconnection module 105, when the SD bus is available. When the value of the "request_level" is 1 (=if notify required), the host SD PAL module 203 requests the host which is accessing the bus to suspend the bus handle such that the host SD PAL module 203 can obtain the bus handle, and requests notification that the bus handle has come to be available.

The "BusHandleResume.response" is a response to the "BusHandleResume.request". The "BusHandleResume.response" includes "result_code" and "modification_flag".

The "modification_flag" has a value of 0 or 1. The value "0" (=not changed) of the "modification_flag" means that data in the SD device has not been changed by another host while the SD bus handle is inactivated. The value "1" (=changed) of the "modification_flag" means that the SD bus handle in the inactivated state has been activated by another host and data in the SD device has been changed.

The "result_code" has a value of 0, 1, or 2. The value "0" (=success) of the "modification_flag" means that the bus has been activated with success by the host SD PAL module 203. The value "1" (=error_busy) of the "modification_flag" means that the SD bus has already been activated by another host. The value "2" (=error_locked) of the "modification_flag" means that the SD bus is inactivated and locked by another host.

Next, a command "BusHandleSuspend.request" which is transmitted from the host SD application to the SD interconnection module 105, and a command "BusHandleSuspend.response" which is transmitted from the SD interconnection module to the host SD application in response to reception of the "BusHandleSuspend.request" will be explained hereinafter (FIG. 18).

The command "BusHandleSuspend.request" is a command which requests suspending the SD bus. The "BusHandleSuspend.request" includes "lock_flag" and "modification_flag".

The "lock_flag" has a value of 0 or 1. The value "0" (=unlocked) of the "lock_flag" means that another host can access the SD bus while the SD bus handle is inactive. The value "1" (=locked) of the "lock_flag" means that another host cannot access the SD bus while the SD bus is inactive.

The "modification_flag" has a value of 0 or 1. The value "0" (=not changed) of the "modification_flag" means that data in the SD device has not been changed while the SD bus handle is active. The value "1" of the "modification_flag" means that data in the SD device has been changed while the SD bus handle is active.

The "BusHandleSuspend.response" is a response to the "BusHandleSuspend.request". The "result_code" has a value of 0 (=success) which means success in suspending the SD bus.

Next, notification from the SD interconnection module 105 to the host will be explained hereinafter (FIG. 19).

In "ReqForBusHandleSuspend.notification", the device SD PAL module 102 requests the host SD PAL module 102 to suspend the SD bus in the unlocked mode or terminate the SD bus, since another host starts access to the SD bus.

In "ReqForBusHandleRelease.notification", the device SD PAL module 102 requests the host SD PAL module 102 to terminate the SD bus, since another host starts access to the SD bus.

In "BusHandleSuspended.notification", the device SL PAL module 102 notifies the host SD PAL module 102 that the SD bus is suspended by another host. When the notification is transmitted, the host SD PAL module 102 can start or suspend the SD bus.

In "BusHandleReleased.notification", the device SD PAL module 102 notifies the host SD PAL module 102 that the SD bus handle is released by another host. When the notification is transmitted, the host SD PAL module 102 can start or suspend the SD bus.

Next, another example of transition of the state of the SD bus handle for the host 200 will be explained hereinafter with reference to FIG. 20.

The non-assigned state "Bus handle not assigned" is a state in which the SD bus handle is not assigned to the host 200. In this state, the device 100 can access the SD bus and the SD memory card 300.

When the SD bus handle is obtained by the host 200 (Get Bus Handle), the state of the SD bus handle for the host 200 is changed from the non-assigned state to the active state (Bus handle active). In the active state, the host 200 can access the SD bus and the SD memory card 300.

When the SD bus handle is suspended, the state of the SD bus handle for the host 200 is changed from the active state (Bus handle active) to the locked inactive state (Bus handle inactive). In the locked inactive state, the device 100 cannot access the SD bus or the SD device. When the SD bus is resumed in the bus inactive state, the SD bus handle is changed from the bus inactive state (Bus handle inactive) to the bus active state (Bus handle active).

In this example, when the SD bus handle is suspended, the SD bus handle is always set to the lock mode. The embodiment described above is based on FIG. 5, and the bus handle is changed to the unlocked inactive state in suspending when it is unnecessary to lock the bus handle. In comparison with this, as illustrated in FIG. 20, the bus handle may be released and changed to the bus handle inactive state, instead of being suspended, in suspending in which it is unnecessary to lock the bus handle.

Although the above embodiment shows the example in which the removable medium is an SD card (Registered Trademark), the removable medium includes a memory card which has a memory function, an 10 card which has a communication function, and a combo card which has both the memory function and the communication function. The removable medium may not be removable, but may be contained in the electronic apparatus.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An access control apparatus comprising:
   a medium communication module implemented in a computer and configured to perform communication with a removable medium;
   an access module implemented in the computer and configured to perform access to the removable medium using the medium communication module;
   a wireless communication module implemented in the computer and configured to perform wireless communication with a first external device, and to receive an access request to the removable medium; and
   a control module implemented in the computer and configured to assign an access right to access the removable medium to one of the access module and the first external device, the control module assigning the access right in response to a request of assignment of the access right, the request being transmitted from the first external device or the access module,
   wherein the control module is configured to request one of the access module and the first external device to stop or suspend assignment of the access right when the other of the access module and the first external device requests assignment of the access right in a state where said one of the access module and the first external device is accessing the removable medium, and to notify the other of the access module and the first external device that the assignment of the access right is stopped or suspended after said one of the access module and the first external device stops or suspends the assignment of the access right.

2. The apparatus of claim 1, wherein the control module is configured to request the access module to stop or suspend the assignment of the access right when the first external device requests assignment of the access right in a state where the access module is accessing the removable medium.

3. The apparatus of claim 1, wherein the control module is configured to request the first external device to stop or suspend the assignment of the access right, when the access module requests assignment of the access right in a state where the first external device is accessing the removable medium.

4. The apparatus of claim 1, wherein the wireless communication module is configured to perform wireless communication with a second external device which performs access to the removable medium, and
   the control module is configured to request one of the access module and the second external device to which the access right is assigned, to stop or suspend assignment of the access right when the first external device requests assignment of the access right in a state where the access right is assigned to said one of the access module and the second external device, and the control module is configured to notify the first external device that the assignment of the access right to said one of the access module and the second external device is stopped or suspended, and to assign the access right to the first external device in response to an access request transmitted from the first external device when said one of the access module and the second external device suspends or stops the assignment of the access right.

5. The apparatus of claim 4, wherein the control module is configured to switch the wireless communication module to a power-saving mode when the access right is not assigned to one of the first external device and the second external device, or the access right is suspended.

6. The apparatus of claim 4, wherein the control module is configured to switch the medium communication module to a power-saving mode, when the access right is not assigned to one of the access module, the first external device and the second external device, or the access right is suspended.

7. The apparatus of claim 4, wherein the control module is configured to request the access module to stop or suspend assignment of the access right, when the second external device requests assignment of the access right in a state where the access module is accessing the removable medium.

8. The apparatus of claim 4, wherein the control module is configured to request the first external device to stop or suspend assignment of the access right, when the second external device requests assignment of the access right in a state where the first external device is accessing the removable medium.

9. The apparatus of claim 4, wherein the control module requests the first external device to stop or suspend assignment of the access right, when the access module requests assignment of the access right in a state where the first external device is accessing the removable medium.

10. The apparatus of claim 1, wherein the control module is configured to switch the wireless communication module to a power-saving mode, when the access right is not assigned to the first external device, or the access right is suspended.

11. The apparatus of claim 1, wherein the control module is configured to suspend assignment of the access right in a lock mode to the access module to which the access right is assigned, when the access module requests suspending the assignment of the access right in the lock mode, and wherein when the first external device requests assignment of the access right in the lock mode while the assignment is suspended, the control module does not assign the access right to the first external device.

12. The apparatus of claim 11, wherein the control module is configured to request one of the access module and the first external device to stop or suspend assignment of the access right thereto, when there is a request to assign the access right, under a condition that said one of the access module and the first external device is requested to release the access right when the access right is assigned thereto.

13. An access control apparatus comprising:
   a medium communication module implemented in a computer and configured to perform communication with a removable medium;
   an access module implemented in the computer and configured to perform access to the removable medium using the medium communication module;
   an obtaining module implemented in the computer and configured to obtain a file system related information that is stored in the removable medium, and to cache the file system related information;

a wireless communication module implemented in the computer and configured to perform wireless communication with an external device, and to receive access to the removable medium;

a control module implemented in the computer and configured to notify one of the access module and the external device that data in the removable medium has been changed when an access right of said one of the access module and the external device is resumed from an inactive state and the data in the removable medium is changed; and a notifying module implemented in the computer and configured to notify the control module whether the data in the removable medium has been changed during an active state when the access module suspends or stops the access right, wherein the obtaining module is configured to delete a cache of the file system related information in response to notification from the control module, and the control module is configured to notify the access module that the data in the removable medium has been changed when the access module resumes the access right in response to notification from the notifying module.

14. An access control system comprising an access control apparatus and one or more external devices, the access control apparatus comprising:

a medium communication module configured to perform communication with a removable medium;

an access module configured to perform access to the removable medium;

a wireless communication module configured to perform wireless communication with the external devices, and to receive access to the removable medium; and a control module configured to assign an access right to access the removable medium to one of the access module and the external devices, the control module assigning the access right in response to a request of assignment of the access right, the request being transmitted from one of the external devices and the access module, wherein the control module is configured to request one of the access module and the first external device to stop or suspend assignment of the access right when the other of the access module and the first external device requests assignment of the access right in a state where said one of the access module and the first external device is accessing the removable medium, and to notify the other of the access module and the first external device that the assignment of the access right is stopped or suspended after said one of the access module and the first external device stops or suspends the assignment of the access right, each of the external devices comprising:

a wireless communication module configured to communicate with the access control apparatus; and an access control module configured to transmit a request to assign the access right by using the wireless communication module, and to access the removable medium when the access right is assigned from the control module.

* * * * *